(12) United States Patent
Kimball et al.

(10) Patent No.: US 6,976,393 B1
(45) Date of Patent: Dec. 20, 2005

(54) PYGMY CURRENT METER WITH MAGNETIC SWITCH

(75) Inventors: Scott A. Kimball, Pass Christian, MS (US); Janice M. Fulford, Bay St. Louis, MS (US)

(73) Assignee: The United States of America as represented by the Secretary of the Department of the Interior, Washington, DC (US)

( * ) Notice: Subject to any disclaimer, the term of this patent is extended or adjusted under 35 U.S.C. 154(b) by 23 days.

(21) Appl. No.: 10/794,647

(22) Filed: Mar. 8, 2004

(51) Int. Cl.⁷ .......................................... G01D 21/00
(52) U.S. Cl. .................. 73/170.29; 73/861.85; 73/170.08
(58) Field of Search .................... 73/170.29, 861.22, 73/861.83, 861.76, 170.08, 861.85

(56) References Cited

U.S. PATENT DOCUMENTS

| | | | |
|---|---|---|---|
| 2,614,425 A * | 10/1952 | Falk | 73/861.76 |
| 2,813,424 A * | 11/1957 | Liepmann et al. | 73/861.22 |
| 3,788,142 A * | 1/1974 | Goransson | 73/861.83 |
| 4,122,714 A | 10/1978 | Kobayashi et al. | 73/194 |
| 4,840,062 A * | 6/1989 | Futrell, II | 73/170.29 |
| 4,866,985 A * | 9/1989 | Futrell, II | 73/170.29 |
| 6,618,680 B2 | 9/2003 | Ross et al. | 702/45 |

* cited by examiner

Primary Examiner—Edward Lefkowitz
Assistant Examiner—Andre Allen
(74) Attorney, Agent, or Firm—Mark Homer

(57) ABSTRACT

An apparatus for measuring fluid velocity includes a generally Y-shaped yoke including a base and first and second forks, the first and second forks including through holes at ends thereof; a bucket wheel supported between the first and second forks of the yoke; a first shaft that passes through the through hole in the first fork and supports one side of the bucket wheel; a second shaft that passes through the through hole in the second fork and supports the other side of the bucket wheel, the second shaft rotating with the bucket wheel and including a magnet mounted therein; the second fork of the yoke including an opening for receiving a reed switch assembly, the opening communicating with the through hole in the second fork, the magnet on the second shaft being aligned with the opening whereby when the second shaft rotates the magnet passes by the opening; and a reed switch assembly mounted in the opening in the second fork of the yoke.

8 Claims, 2 Drawing Sheets

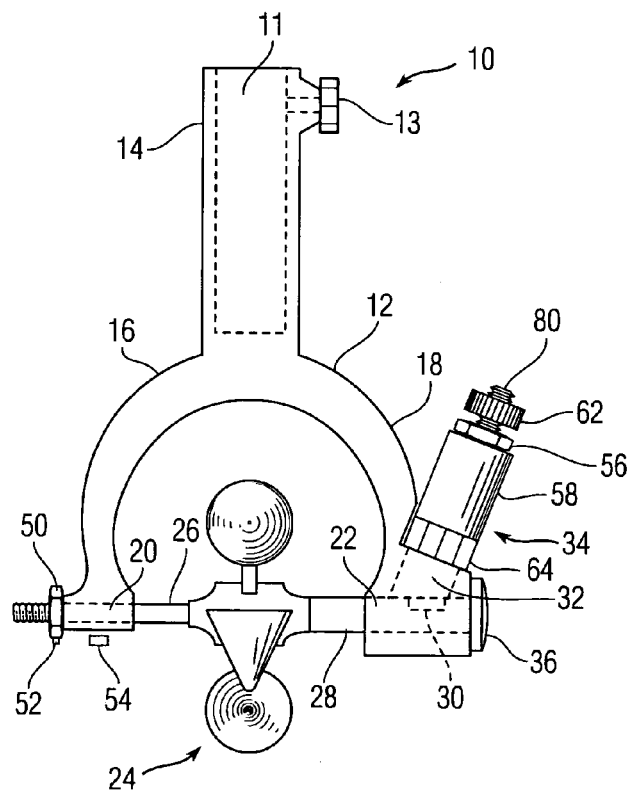
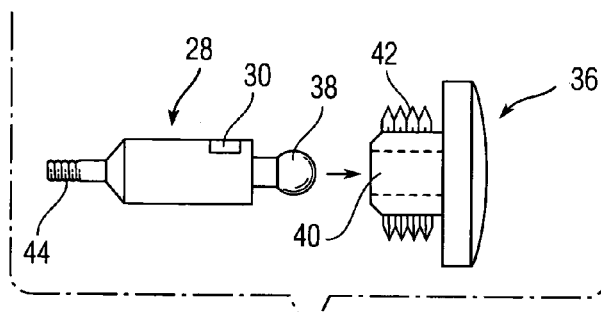
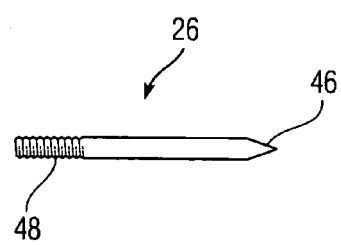
Fig. 1
Fig. 2
Fig. 3

PYGMY CURRENT METER WITH MAGNETIC SWITCH

STATEMENT OF GOVERNMENT INTEREST

The invention described herein may be manufactured and used by or for the Government of the United States of America for government purposes without the payment of any royalties therefor.

BACKGROUND OF THE INVENTION

The invention relates in general to the measurement of fluid velocity and in particular to the measurement of water velocity in shallow streams.

The Price pygmy meter is one of the primary tools used by the U.S. Geological Survey to accurately measure water velocity. The original Price pygmy meter uses a contact switch that is difficult to properly adjust so that it works well at low and high velocities. The contact switch also has a very noisy signal that makes accurate counting of the contact closure difficult when using digital electronic devices. A non-contact switch is needed, but the small size of the meter has made a solution difficult.

Prior switches used in the Price pygmy meter include the contact or "wiper" switch, the Swoffer optic switch and the JBS Hall effect switch. The contact or "wiper" switch is sometimes referred to as the "cat whisker" switch and is the original switch used since the inception of the Price pygmy meter. However, the cat whisker switch is difficult to adjust so that it works properly over a wide range of velocities. Adjustments to the cat whisker switch affect the rated performance of the meter, especially at low velocities, thereby reducing the meter's accuracy.

Optic switches work well until water intrudes and refracts the emitted light thereby preventing the switch from closing. A watertight submersible meter is difficult and expensive to build. In addition, the optic switch will not work with a simple two wire connection. Hall effect switches open and close based on opposite ends of the magnetic pole. The Hall effect switch is open half the time and closed half the time, thereby adversely affecting the counting accuracy at low velocities. The Hall effect switch is a solid state device that requires continuous current to operate, making a simple two wire connection more complicated. A currently used Hall effect switch uses a dedicated three wire cable that extends from the meter up to the digital counter, thereby exposing several feet of wire to water velocities.

BRIEF DESCRIPTION OF THE DRAWINGS

In the drawings, which are not necessarily to scale, like or corresponding parts are denoted by like or corresponding reference numerals.

FIG. 1 is an elevation view of one embodiment of a velocity meter according to the invention.

FIG. 2 is a side view of the second shaft 28 and bearing end cap 36.

FIG. 3 is a side view of the first shaft 26.

DETAILED DESCRIPTION OF THE PREFERRED EMBODIMENTS

Figure 4:
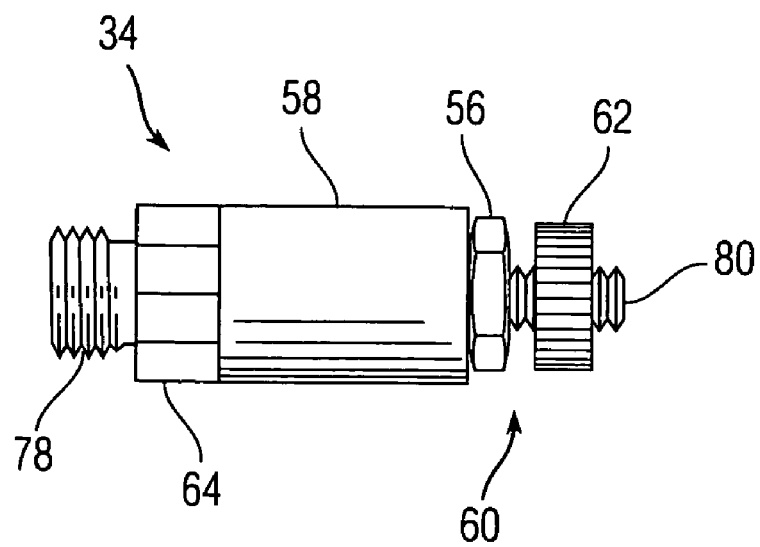
FIG. 4 is a side view of the reed switch assembly 34.

FIG. 1 is an elevation view of one embodiment of a fluid velocity (current) meter 10 according to the invention. Velocity meter 10 includes a generally Y-shaped yoke 12 that comprises a base 14 and first and second forks 16, 18. Yoke 12 is made of an electrically conductive material, for example, chrome plated red brass. The first and second forks 16, 18 include through holes 20, 22 at their respective ends. A bucket wheel 24 is supported between the first and second forks 16, 18 of the yoke 12. Bucket wheel 24 may be made of, for example, chrome plated brass. Examples of bucket wheels may be found in U.S. Pat. Nos. 4,866,985 and 4,840,062.

A first shaft 26 passes through the through hole 20 in the first fork 16 and supports one side of the bucket wheel 24. A second shaft 28 passes through the through hole 22 in the second fork 18 and supports the other side of the bucket wheel 24. First and second shafts 26, 28 may be made of, for example, stainless steel. The second shaft 28 rotates with the bucket wheel 24. Second shaft 28 includes a magnet 30 mounted therein. The second fork 18 of the yoke 12 includes an opening 32 for receiving a reed switch assembly 34. The opening 32 communicates with the through hole 22 in the second fork 18. The magnet 30 on the second shaft 28 is aligned with the opening 32 so that when the second shaft 28 rotates, the magnet 30 passes by the opening 32. The reed switch assembly 34 is mounted in the opening 32 in the second fork 18 of the yoke 12.

FIG. 2 is a side view showing the second shaft 28 and bearing end cap 36. The end of the second shaft 28 opposite the bucket wheel 24 includes a ball shaped bearing 38. Bearing end cap 36 includes an opening 40 therein for receiving the ball shaped bearing 38 of the second shaft 28. As seen in FIG. 1, the bearing end cap 36 closes the through hole 22 in the second fork 18. Second shaft 28 rotates with bucket wheel 24 and is fixed to the hub of the bucket wheel with, for example, threads 44. Bearing end cap 36 is fixed to second fork 18 by, for example, threads 42.

FIG. 3 is a side view showing the first shaft 26. First shaft 26 includes a pointed end 46 that engages the hub of bucket wheel 24. One end 48 of first shaft 26 is threaded to receive nut 50 (FIG. 1). A middle portion of first shaft 26 may include a flat portion. Set screw 54 (FIG. 1) bears on the flat portion to prevent movement of the first shaft 26. Another set screw 52 may be used with nut 50 to prevent movement thereof.

Figure 5:
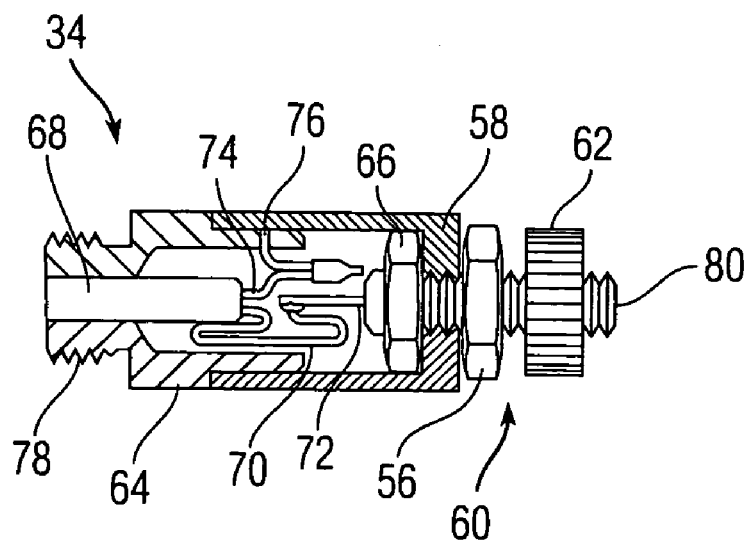
FIG. 5 is a side view partially in section of the reed switch assembly 34.

FIG. 4 is a side view of the reed switch assembly 34 and FIG. 5 is a side view partially in section of the reed switch assembly 34. Reed switch assembly 34 includes an adapter 64 made of an electrically conductive material, such as stainless steel. A reed switch 68 is disposed in the bottom portion of the adapter 64 and may be secured in place with potting material. An electrically insulating sleeve 58 is attached to the top portion of the adapter 64 with, for example, a force fit. Sleeve 58 may be made of, for example, Delrin. A binding post assembly 60 is attached to the sleeve 58. One end of the adapter 64 is inserted in the opening 32 in the second fork 18 of the yoke 12 (FIG. 1) and fixed therein with, for example, threads 78.

The reed switch 68 includes two electrical leads 70, 74. The binding post assembly 60 includes a binding post conductor 72. Electrical lead 70 from the reed switch 68 is connected to the binding post conductor 72 by, for example, soldering. The other electrical lead 74 from the reed switch 68 is connected to the adapter 64 via conductor 76. Binding post assembly 60 includes a central binding post 80 with integral nut 56, a thumbwheel nut 62, nut 66 and binding post conductor 72. The top surface of the sleeve 58 is sandwiched between nuts 56, 66, thereby securing the binding post assembly 60 to the sleeve 58. Binding post 80 terminates in binding post conductor 72, to which is attached lead 70 from reed switch 68.

In operation, a known wading rod (not shown) is attached to the velocity meter 10 by insertion in opening 11 in the base 14 of yoke 12 (FIG. 1). Set screw 13 helps to secure the wading rod in place. An electrical wire (not shown) is connected at one end to the binding post assembly 60 by securing it between the nut 56 and the thumbwheel nut 62. The other end of the wire is connected to the wading rod and thence to a counting device. Flowing water forces the bucket wheel 24 to rotate, which also rotates the second shaft 28 with the magnet 30 disposed therein. Each time the magnet passes the reed switch 68, the reed switch closes thereby forming a closed circuit from the wading rod to the wire (not shown) connected to the binding post assembly 60 thru the binding post conductor 72, the reed switch 68, electrical leads 70 and 74, adapter 64, second fork 18, base 14 and thence back to the wading rod. In a known manner, the number of pulses generated by the reed switch closure are counted and processed.

While the invention has been described with reference to certain preferred embodiments, numerous changes, alterations and modifications to the described embodiments are possible without departing from the spirit and scope of the invention as defined in the appended claims, and equivalents thereof.

What is claimed is:

1. An apparatus for measuring fluid velocity, comprising:
   a generally Y-shaped yoke including a base and first and second forks, the first and second forks including through holes at ends thereof;
   a bucket wheel supported between the first and second forks of the yoke;
   a first shaft that passes through the through hole in the first fork and supports one side of the bucket wheel;
   a second shaft that passes through the through hole in the second fork and supports the other side of the bucket wheel, the second shaft rotating with the bucket wheel and including a magnet mounted therein;
   the second fork of the yoke including an opening for receiving a reed switch assembly, the opening communicating with the through hole in the second fork, the magnet on the second shaft being aligned with the opening whereby when the second shaft rotates the magnet passes by the opening; and
   the reed switch assembly mounted in the opening in the second fork of the yoke.

2. The apparatus of claim 1 wherein an end of the second shaft opposite the bucket wheel includes a ball shaped bearing, the apparatus further comprising a bearing end cap having an opening therein for receiving the ball shaped bearing of the second shaft, the bearing end cap closing the through hole in the second fork.

3. The apparatus of claim 2 wherein the second shaft threadingly engages the bucket wheel.

4. The apparatus of claim 2 wherein the bearing end cap threadingly engages the through hole in the second fork.

5. The apparatus of claim 1 wherein the first shaft includes a pointed end that engages the bucket wheel.

6. The apparatus of claim 1 wherein the reed switch assembly includes an adapter, a reed switch disposed in the adapter, an electrically insulating sleeve attached to the adapter and a binding post assembly attached to the sleeve.

7. The apparatus of claim 6 wherein one end of the adapter is inserted in the opening in the second fork of the yoke and fixed therein with threads.

8. The apparatus of claim 6 wherein the reed switch includes two electrical leads and the binding post assembly includes a binding post conductor, and further wherein one electrical lead from the reed switch is connected to the binding post conductor and the other electrical lead from the reed switch is connected to the adapter.

* * * * *